United States Patent [19]

Burkhard

[11] 4,080,874
[45] Mar. 28, 1978

[54] DRIVE FOR A PAIR OF METERING PUMPS

[76] Inventor: Wilfried W. Burkhard, Muhlegasse 58, Barr, Switzerland, 6340

[21] Appl. No.: 749,512

[22] Filed: Dec. 10, 1976

[30] Foreign Application Priority Data

Dec. 13, 1975 Germany .............................. 2556282

[51] Int. Cl.² .............................................. F04B 23/06
[52] U.S. Cl. ...................................... 92/13.7; 74/110; 74/471 R; 417/429
[58] Field of Search .............. 74/110, 471 R; 92/13.3, 92/13.7; 417/426, 429

[56] References Cited

U.S. PATENT DOCUMENTS 2,752,989   7/1956   Jenkins ............................ 417/429 X Primary Examiner—Alan Cohan
Assistant Examiner—Gerald A. Michalsky
Attorney, Agent, or Firm—Kurt Kelman

[57] ABSTRACT

A pair of metering pumps are fixedly supported on a mounting frame and are driven in tandem by a reciprocable thrust mechanism for driving the piston or cylinder element of the pump. The thrust mechanism is movable transversely to the reciprocating direction and is supported on a frame. Two levers have respective ends linked to the thrust mechanism and to the frame, respectively. One of the reciprocable pump elements is suspended on a respective lever whereby reciprocation of the thrust mechanism causes corresponding reciprocation of the suspended pump element. The levers are held stationary with respect to the thrust mechanism and the suspension of the reciprocable pump elements holds them stationary with respect to the mounting frame.

9 Claims, 5 Drawing Figures

DRIVE FOR A PAIR OF METERING PUMPS

The present invention relates to a drive for a pair of pumps for metering liquid to paste-like materials.

Reciprocating metering pumps are used for accurately dosing liquids, including highly viscous liquids up to a pasty consistence, such as synthetic resins. Particularly in chemical reaction processes, it is necessary to deliver reactants continuously or batch-wise in accurately predetermined ratios and it is desirable to provide for stepless adjustment of the delivery rate of the metering pumps.

Tandem drives for a pair of metering pumps have been proposed wherein the reciprocable piston rods of the pumps are connected to a lever whose pivot is arranged between the pumps. The pivot may be moved laterally towards the metering pump mounted remote from the drive. The metering ratio is thus adjusted by changing the length of the reciprocating stroke of the lever. This arrangement has the disadvantage that the two metering pumps operate in opposed stages, i.e., when one of the pumps takes the material in, the other pump delivers the material. This leads to dosing errors. Furthermore, the adjustment range is limited since only the stroke of one of the pumps may be varied. This requires an increased number of metering pumps with different cylinder diameters. Furthermore, this arrangement has the considerable disadvantage that the piston rods are subjected to radial stresses, causing wear on the pistons and gaskets, and making the use of pump cylinders with small diameters structurally difficult.

Attempts have been made to reduce the effect of radial stresses by mounting the pumps movably to enable them to be laterally displaced. In this case, the material delivery conduits must be flexible and, if these conduits are to be heated, this causes problems. Also, it is difficult to find materials for flexible tubular conduits which are not readily corroded and remain flexible for an extended period of time. Also, considering the fact that viscous liquids and pastes are often delivered to the pumps under relatively high pressures, flexible tubular conduits are subject to bursting, thus being a possible source of accidents. For these and other reasons, rigid pipes are preferred for the delivery of liquids to metering pumps, which requires the pumps to be stationary.

Another pump drive comprises a lever whose pivot is on the side remote from the drive. This arrangement comprises single and double lever systems, the latter systems enabling the use of more than one metering pump side-by-side. In these drives, radial stresses are imparted to the pump pistons or the pumps are laterally movable, each case producing the disadvantages indicated hereinabove. In all these known drives, the total throughput is reduced proportionally to a change of the delivery ratio from a 1 : 1 equilibrium between the two pumps.

Pump drives have also been used with a lever system in which the levers are arranged in scissors fashion. These known systems are very complex, however, and accordingly expensive, the adjacent levers exerting assymmetric forces causing excessive wear. The opposing radial movements must be absorbed by special straps or the like.

It is the primary object of this invention to provide a drive for a pair of pumps for metering liquid to paste-like materials, which are simple to build, relatively small in size and exhibit great adjustability of the dosing ratios of the materials delivered by the pumps.

The above and other objects are accomplished in accordance with the invention with a drive which comprises a reciprocable thrust mechanism for driving one of the pump elements, i.e., the piston rod or the cylinder, for reciprocation in a first direction, the thrust mechanism being arranged for movement in relation to the mounting frame which fixedly supports a pair of pumps in spaced relationship in a second direction transverse to the first direction. A frame supports the thrust mechanism and two levers have respective ends linked to the thrust mechanism and to the frame, respectively. One of the pump elements is suspended on a respective one of the levers whereby reciprocation of the thrust mechanism causes corresponding reciprocation of the suspended pump elements, the levers are laterally stationary with respect to the thrust mechanism and the suspension is laterally stationary with respect to the mounting frame.

Such a drive arrangement has the considerable advantage that a large adjustment range may be obtained with a small and simple structure. Advantageously, the metering pumps are stationary in this arrangement, making it possible to supply them with rigid piping. The drive can be used selectively for continuous or batch-wise operations. Extremely small diameter pumps may be used since the pistons are not subjected to radial stresses. Furthermore, while the metering ratios may be varied widely, the throughput of the pumps remains almost unchanged. Thus, a single pair of pumps may be used over a wide range and this range may be further increased by the use of pumps with other diameters adapted to the stroke ratios of the lever system. Since the thrust mechanism is displaceable transversely to the reciprocating direction of the pump pistons, radial stresses are eliminated by simply sliding the thrust mechanism in the transverse direction when pumps with very small diameters are used. Instead of slidingly mounting the thrust mechanism, push rods and like means may be used for the purpose of displacing the same.

The above and other objects, advantages and features of the present invention will become more apparent from the following detailed description of a now preferred embodiment thereof, taken in conjunction with the accompanying drawing wherein.

Figure 1:
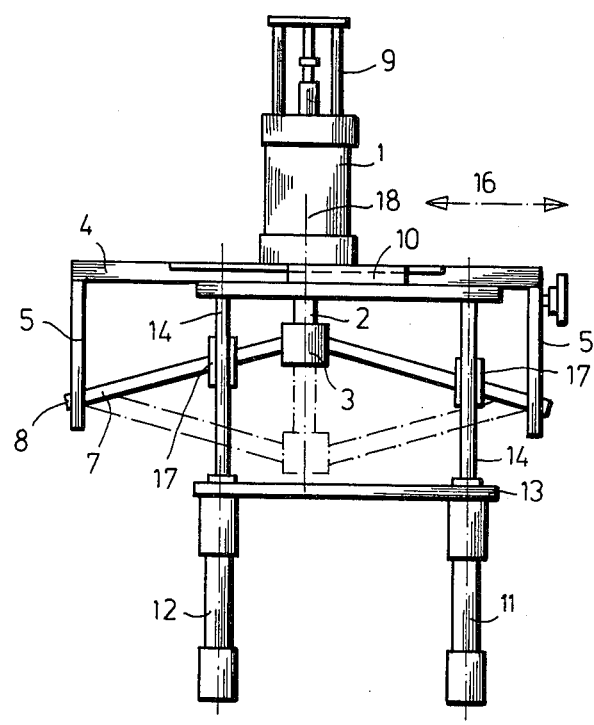
FIG. 1 is a side elevational view of a metering pump unit connected to a pump drive according to an embodiment of this invention.

Referring now to the drawing, there is shown reciprocable thrust mechanism 1 which is shown, by way of example, as a cylinder containing reciprocable piston rod 2 driven in the cylinder by compressed air. The piston rod carries connecting part 3 at its outer end and stroke limiting device 9 is mounted atop the cylinder of the thrust mechanism to limit the reciprocating stroke of the mechanism. In the illustrated embodiment, mounting plate 4 of a frame including lateral supports 5 fixedly supports thrust mechanism 1. Two levers 6 and 7 have respective ends linked to connecting part 3 of the thrust mechanism and to lateral supports 5 of the thrust mechanism supporting frame, respectively. Preferably, the lever ends are mounted for universal motion, for instance, by ball-and-socket joints mounting the inner ends of the levers in connecting part 3 while their outer ends 8 are similarly mounted in lateral supports 5. In this manner, reciprocation of piston rod 2 of pneumatically operated thrust mechanism 1 will cause levers 6 and 7 to be moved from a neutral position, shown in full lines in FIG. 2, to two end positions shown in chain-dotted lines. Ends 8 of the levers are held against reciprocating movement in lateral supports 5. Stroke limiting device 9 may be adjusted when the pumping unit is used for the batch-wise delivery of materials so as to determine the delivered amount of materials in each batch.

The pump unit comprises a pair of metering pumps 11 and 12 each of which comprises a piston rod element and a cylinder element, one of the pump elements being reciprocable in relation to the other. While the illustrated embodiment shows the reciprocable element to be the piston rod, it will be obvious to those skilled in the art that the operation would be identical if the cylinder were reciprocable and the piston rod were held stationary. A mounting frame fixedly supports the pumps, i.e., the stationary element thereof, in spaced relationship, the mounting frame being comprised of a pair of mounting plates 13 and 15 substantially parallel to each other and two guide columns 14 fixedly interconnecting the mounting plates.

Mounting plate 15 carries guide rails 10 wherebetween mounting plate 4 of the thrust mechanism frame is mounted for movement in relation to the mounting frame in a direction transverse to the direction of reciprocation of the reciprocable pump elements, as shown by double-headed arrow 16. Thus, the drive unit is reciprocable transversely in relation to the pump unit by sliding the drive unit along track 10. It will be obvious to those skilled in the art that the operation would remain unchanged if mounting plate 4 were stationary with respect to mounting plate 15 and thrust mechanism 1 were transversely reciprocable.

The upper ends of the piston rods of the pumps are suspended on a respective one of levers 6 and 7 whereby reciprocation of thrust mechanism 1 causes corresponding reciprocation of the suspended piston rods to drive the pumps. The illustrated suspension means is constituted by sliding element 17 mounted on guide column 14 for reciprocating sliding movement therealong. The sliding elements are connected to the levers in a manner to enable the levers to move transversely, with respect to the reciprocating direction thereof. This transverse movement in the direction of arrow 16 steplessly adjusts the stroke of each pump by changing the position of the fulcrum of each operating lever 6, 7, each fulcrum being constituted by a respective sliding element 17. Connecting part 3 of thrust mechanism 1 serves as a fixed point for the levers, the illustrated arrangement holding the levers laterally stationary with respect to the thrust mechanism by means of connecting part 3 while suspending means 17 are held stationary with respect to the mounting frame for the pump unit, i.e., the pumps.

Figure 2:
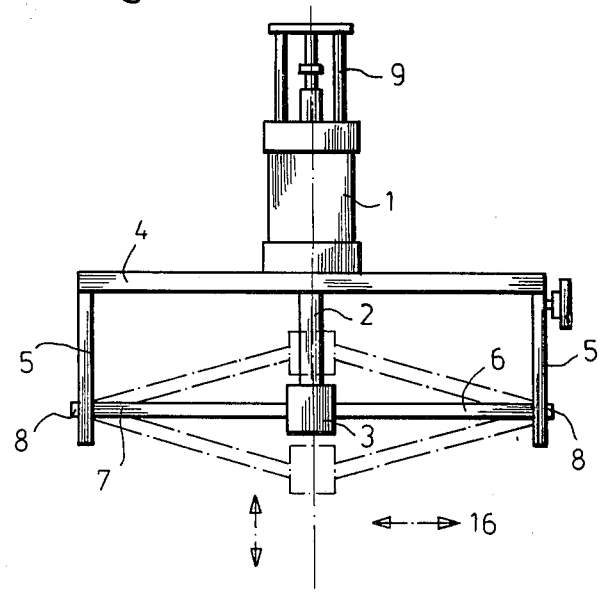
FIG. 2 is a like view of the drive alone.
Figure 3:
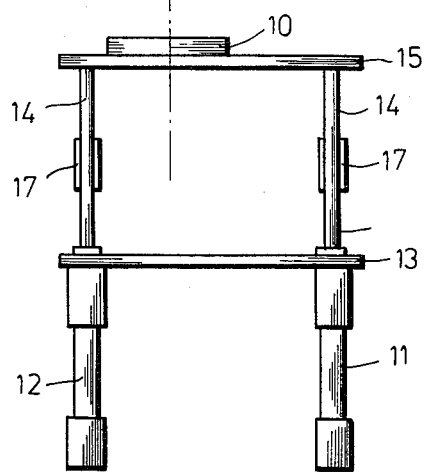
FIG. 3 is a like view of the pump unit alone.

When the pump and drive units are aligned with respect to center line 18 of the drive unit in the manner shown in FIGS. 2 and 3, the piston rod of pump 11 will have a shorter stroke than that of the piston rod of pump 12. Relative transverse movement between thrust mechanism 1 and piston rods suspended on the operating levers will steplessly change the ratios between the operating strokes of the two pumps which are driven in tandem by the pivoting levers.

Figure 4:
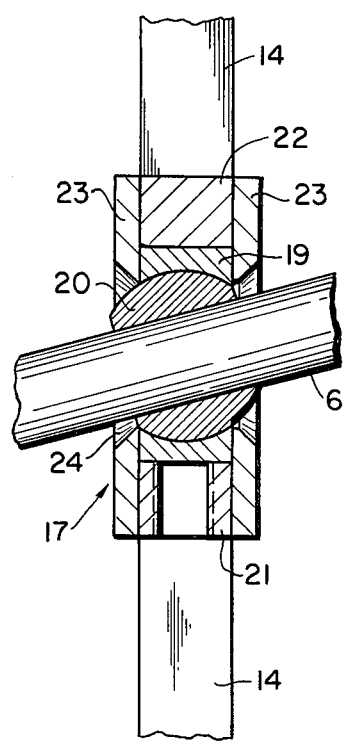
FIG. 4 shows a specific embodiment, partly in section, of a connection of the piston rod to a pump to the driving lever.
Figure 5:
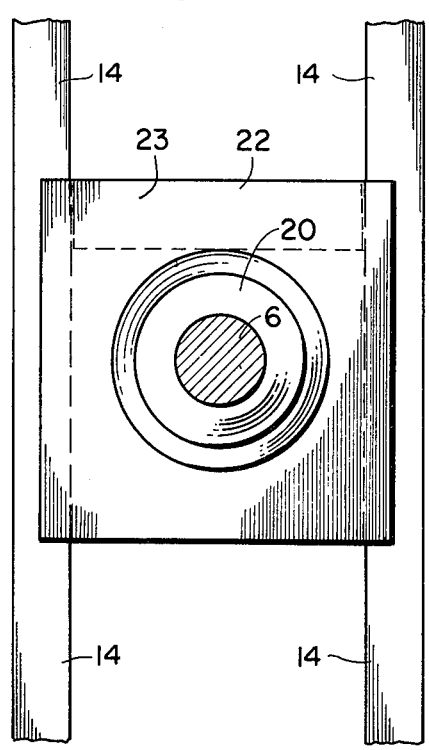
FIG. 5 is a side elevational view thereof.

FIGS. 4 and 5 illustrate a specific suspension means 17 for the piston of the pump. In this embodiment, guide column 14 consists of two guide posts 14, spaced apart in a direction perpendicular to the elongation of levers 6, 7 and the suspension means 17 comprises a pair of guide plates 23 interconnected by spacing member 22 and bushing 21 to form a sliding element guided along guide posts 14. The piston rod of the metering pump (not shown) is threadedly mounted in bushing 21 and extends downwardly therefrom between the guide posts.

Socket 19 is held between spacing member 22 and bushing 21 to form part of the sliding element, and ball 20 is mounted for universal movement in the socket. The ball of the ball-and-socket joint has a diametrically extending bore which glidably receives lever 6, thus enabling the lever to slide therein in the direction of its longitudinal extension. Guide plates 23 define openings 24 of a dimension sufficient to enable ball 20 to move universally, with lever 6.

The piston rods of metering pumps 11, 12 are mounted so that, during their reciprocating stroke, fixed points define an accurately determined stroke. In the illustrated embodiment, levers 6 and 7 have a fixed point at connecting part 3 while they are transversely slidable in sliding elements 17 and lateral supports 5 during reciprocation of the sliding elements for operation of the pumps. Other fixed points may be chosen for the operating levers, for instance by holding lever ends 8 fixed while the levers are slidable in sliding element 17 and connecting part 3, or holding the levers stationary in the sliding elements while they are slidable in supports 5 and connecting part 3. In all embodiments, the levers must be mounted stationary at one fixed point.

The illustrate pump drive may be readily adapted to various space and other operating requirements. For instance, the metering pumps may be mounted above or below the thrust mechanism, or laterally thereof, i.e., the pump reciprocation may be effected in a horizontal direction and the movement of the thrust mechanism with respect to the pumps may then be vertical.

In the embodiment illustrated in FIGS. 1 to 3, operating levers 6 and 7 are slidably mounted in sliding elements 17 and lateral supports 5 but, equivalently, instead of glidingly mounting lever ends 8 in supports 5, the lever ends may be slidably mounted in connecting part 3. Similarly and equivalently, sliding elements 17 sliding along guide columns 14 may be replaced by push rods suspending the reciprocable pump elements, for instance the piston rods, on the levers for transmitting the thrust of the pivoting levers to the reciprocable pump elements. Also, outer ends 8 of the operating levers may be held against reciprocation by push rods, straps or the like. Similarly, the thrust of mechanism 1 may be transmitted to levers 6 and 7 by means of push rods, straps or the like.

What is claimed is:

1. A drive for a pair of pumps for metering liquid to paste-like materials, each of the pumps comprising a piston rod element and a cylinder element, one of the pump elements being reciprocable in relation to the other, and a mounting frame fixedly supporting the metering pumps in spaced relationship, the drive comprising (a) a reciprocable thrust mechanism for driving the one element of the pumps for reciprocation in a first direction, (1) the thrust mechanism being arranged for movement in relation to the mounting frame in a second direction transverse to the first direction,
(b) a frame supporting the thrust mechanism,
(c) two levers having respective ends linked to the thrust mechanism and to the frame, respectively, and
(d) means suspending the one pump element to the pump on a respective one of the levers whereby reciprocation of the thrust mechanism causes corresponding reciprocation of the suspended pump elements, the levers being laterally stationary with respect to the thrust mechanism and the suspending means being laterally stationary with respect to the mounting frame.

2. The pump drive of claim 1, further comprising means for limiting the reciprocating stroke of the thrust mechanism.

3. The pump drive of claim 1, wherein the thrust mechanism comprises a piston rod having an outer end, the levers having one of their ends linked to the outer piston rod end.

4. The pump drive of claim 1, wherein the one pump element suspended on each of the levers is the piston rod of a respective one of the pumps.

5. The pump drive of claim 1, wherein the mounting frame comprises a pair of mounting plates substantially parallel to each other and two guide columns fixedly interconnecting the mounting plates, the pumps being fixedly supported on one of the mounting plates, and the suspending means comprises respective sliding elements mounted on the guide columns for reciprocating sliding movement therealong in the first direction, the sliding elements being connected to the levers and the one pump element being affixed to the sliding elements for reciprocation therewith.

6. The pump drive of claim 5, further comprising a ball-and-socket joint mounting each of the levers in a respective one of the sliding elements.

7. The pump drive of claim 1, wherein the frame comprises a mounting plate and two lateral supports affixed thereto, the thrust mechanism comprises a reciprocable push rod having an end linked to one of the ends of the levers for transmitting thrust from the reciprocable push rod to the levers, and the other ends of the levers are linked to the lateral supports of the frame and held therein against reciprocating movement.

8. The pump drive of claim 7, wherein the thrust mechanism is fixedly supported on the frame and the frame is mounted on the mounting frame for movement thereon in the second direction.

9. The pump drive of claim 1, wherein the levers are arranged in a scissors arrangement and pivot about the lever ends linked to the thrust mechanism.

* * * * *